(No Model.)
F. X. BYERLEY.
EXTRACTING OIL AND OTHER SUBSTANCES FROM SEEDS AND OTHER MATERIALS BY MEANS OF SOLVENTS.
No. 307,707. Patented Nov. 4, 1884.
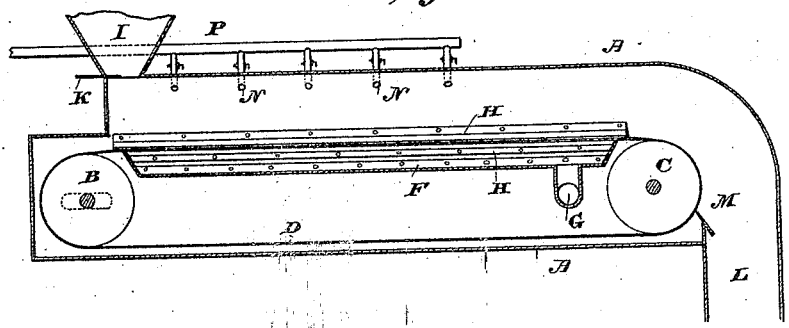
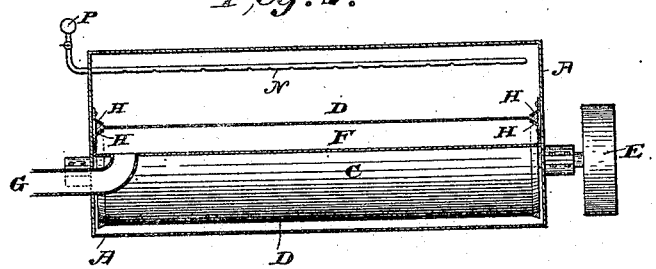

UNITED STATES PATENT OFFICE.

FRANCIS X. BYERLEY, OF CLEVELAND, OHIO.

EXTRACTING OIL AND OTHER SUBSTANCES FROM SEEDS AND OTHER MATERIALS BY MEANS OF SOLVENTS.

SPECIFICATION forming part of Letters Patent No. 307,707, dated November 4, 1884.

Application filed August 6, 1883. (No model.)

*To all whom it may concern:*

Be it known that I, FRANCIS X. BYERLEY, a citizen of the United States, residing at Cleveland, in the county of Cuyahoga and State of Ohio, have invented certain new and useful Improvements in Extracting Oil and other Substances from Seeds and other Materials by Means of Solvents, of which the following specification is a full, clear, and exact description.

This invention relates more particularly to the extraction of linseed-oil from the seed-meal by means of a solvent, (usually and preferably a light product of petroleum—such as naphtha;) but it is, in whole or in part, applicable to the extraction of oil or grease from other materials, or to the extraction of other substances by means of solvents. The apparatus employed for the purpose is commonly known as a "percolator."

In Letters Patent No. 275,989, granted to me April 17, 1883, is embraced a process of extracting by solvents, in which the linseed-meal or other matter to be treated is placed upon a movable foraminous diaphragm or strainer, and while resting thereon is treated with the solvent, which percolates through the meal or other material and the strainer, dissolving and carrying off the oil or other soluble substance, the percolation being assisted, when desired, by producing a vacuum under the strainer.

The present invention may be considered as a modification or particular mode of carrying out said process; and it consists in supporting the meal or other material upon a strainer in the form of an endless belt traveling over suitable rollers, instead of upon a circular diaphragm or strainer, as particularly described in said patent.

It also consists in the particular construction, combination, and arrangement of parts in the apparatus.

In the accompanying drawings, Figure 1 is a view in vertical longitudinal section, and Fig. 2 a view in cross-section, of an apparatus constructed in accordance with the invention.

A is a case or box, of sheet-iron or other suitable material, in which are supported the rollers or drums B C, journaled in bearings or boxes attached to the side of the case. One of these drums or rollers, B, has or may have its bearings adjustable, so that the distance between the drums may be regulated, the case A being slotted, as shown in Fig. 1, for the passage of the journals.

Around the periphery of the drums B C is placed the endless belt D, of canvas or other material which will retain the linseed-meal or other material and allow the solvent to pass through, and which is not acted upon injuriously by the material or solvent.

For extracting oil from linseed-meal, and for extracting many other substances, cotton canvas will answer well. The belt is caused to revolve through a pulley, E, on one of the journals of the drum C. Under the upper layer of the belt, and between the drums B C, is secured a receptacle, F, to catch the solution which passes through the strainer or belt. A pipe, G, extends from the bottom of the receptacle out at the side of the case A. As shown, the receptacle is formed by a horizontal partition (of sheet-iron) provided with a flange, which is bolted or riveted to the side walls of the case A. The partition constitutes the bottom and two end walls of the receptacle, the sides being formed by the side walls of the case A. The end walls extend above the highest points of the drums B C, so as to make a tight joint with the belt or apron.

Within the receptacle F, or rather partly within and partly above the said receptacle, are the guides H, bolted or riveted by means of their flanges to the sides of case A, so as to leave between them a groove, in which the upper part of the belt is guided. The object of this is to make a tight or close joint at the sides of the belt. The more effectually to accomplish this object the edges are thickened by doubling the canvas or other material composing the strainer, or otherwise making them fit (more or less accurately) the groove.

Above the endless belt, near the drum or roller B, is a hopper, I, which extends nearly or quite the full width of the said belt, and is provided with a valve, (shown as a slide, K,) for regulating the amount of material passing through it. The seed-meal or material to be treated is delivered from the hopper onto the endless belt. At the opposite end of the case A, below the endless belt and drum or roller C, is a chute, L, for delivering the material after treatment into a receiver therefor. A scraper, M, extending the full width of the belt, insures the removal of the meal or other material. This scraper is or may be of ordinary construction. The case A is preferably closed, except at the hopper and chute, in order to prevent loss of the solvent by evaporation.

In the upper part of the case A are a series of pipes, N, extending across the case and provided on the under side with holes at short intervals. They serve to distribute the solvent over the seed-meal or other material. As shown, each of these distributing-pipes is provided with a regulating-cock for controlling the flow, and all connect with a common supply-pipe, P.

To extract oil from linseed-meal, the latter is placed in the hopper I, and is delivered upon the endless belt, which is slowly revolved. A depth of about six inches may with advantage be maintained on the endless belt. The solvent (say naphtha) is distributed over the meal from the supply-pipes. It percolates through the meal, dissolving out the oil, and drains off through the belt or strainer into the receptacle F. To assist the operation a vacuum is or may be maintained in the said receptacle by means of a pump or other aspirator connected with the pipe G. The amount of solvent to be distributed over the meal will of course be varied according to circumstances. If the belt moves from end to end of the receptacle in thirty to forty minutes, and a depth of six inches of the average run of meal is maintained on the belt, each of the five distributing-pipes shown may deliver three quarts per minute, the belt being thirty-six inches wide. These figures are given simply by way of example, and not to limit the invention thereto, since it is obvious that the solvent could be used in a larger or smaller proportion than that stated. For other materials the quantities will be adapted to the particular material and solvent employed. The dimensions of the apparatus will of course depend upon the amount of material to be treated. Where the belt is long, the upper middle part should be supported upon rollers to prevent sagging. Thirty or forty minutes will generally be sufficient for the percolation, although a longer or shorter time may be employed when deemed necessary or desirable. The time occupied in passing the length of the receptacle F is of course the time allowed for percolation.

The number of distributing-pipes may be varied.

Six inches has been given as the proper depth for the material treated; but this is not essential, since the depth may be more or less. A depth of from three to twelve inches may be used with good results.

It may be observed that heretofore it has been proposed to draw the linseed-meal or material from which the oil is to be extracted through a body of solvent by means of a series of buckets attached to an endless chain, said buckets being in part of foraminous material, in order that they may act as strainers. This mode of extraction differs essentially from that of the present invention, since in the latter the strainer, which is in the form of an endless belt, forms a support for the meal or material to be treated and the solvent is distributed over it.

I claim the new improvements herein described, all and several, to wit:

1. The improvement in extracting oil and other substances from seeds and other materials, consisting in distributing the solvent over the seed-meal or other material placed in a layer of suitable depth on an endless revolving belt constituting a strainer, and permitting the said solvent, by percolating through said material and strainer, to dissolve out and carry off the oil or other substance, substantially as described.

2. The improvement in extracting oil and other substances from seeds and other materials, consisting in delivering the seed-meal or other material upon an endless revolving belt constituting a strainer, so as to form a layer of suitable depth thereon, distributing the solvent over said layer, permitting it by percolation to dissolve out and carry off the oil or other material to be extracted, and assisting the percolation by maintaining a vacuum under the belt, substantially as described.

3. The percolator provided with an endless belt for the strainer, substantially as described.

4. The combination, with the case, hopper, and chute, of the endless belt constituting the strainer, the series of distributing-pipes, and the receptacle for the solution, substantially as described.

5. The endless belt having its edges fitted within grooves at the sides thereof, substantially as described.

6. The receptacle for the solution, formed of a partition secured to the sides of the inclosing-case, substantially as described.

7. The combination, with the inclosing-case, hopper, chute, distributing-pipes, endless belt, and drum or supporting-rollers, of the receptacle under the upper part of the belt between the drum or supporting-rollers, and the means for making a close joint between it and the belt, substantially as described.

8. A percolator provided with a revolving strainer inclosed in a tight case, provided with inlet-hopper and outlet-chute, in combination with the distributing-pipes and the receptacle for the solution within said case, substantially as described.

In testimony whereof I affix my signature in presence of two witnesses.

FRANCIS X. BYERLEY.

Witnesses:
 WM. K. KIDD,
 W. G. CLEVELAND.